United States Patent Office 3,485,885
Patented Dec. 23, 1969

3,485,885
**PROCESS FOR THE PURIFICATION OF
2,6-DIMETHYLNAPHTHALENE**
Melvin E. Peterkin, Brookhaven, and Kenneth A. Scott, Swarthmore, Pa., assignors to Sun Oil Company, Philadelphia, Pa., a corporation of New Jersey
Filed Apr. 22, 1968, Ser. No. 723,104
Int. Cl. C07c 7/14
U.S. Cl. 260—674          8 Claims

ABSTRACT OF THE DISCLOSURE 2,6-dimethylnaphthalene (2,6 - DMN) can be recovered from a hydrocarbon feed containing it by crystallizing the feed stock so as to increase the free 2,6-DMN concentration in a slurry which is subjected to centrifuging at preferably over 800 G's in a series of increasing temperature stages to any desired purity up to 99+ percent.

---

This invention relates to a process for recovery of 2,6-dimethylnaphthalene. More particularly the invention relates to a process that provides a means of recovery of 2,6-dimethylnaphthalene (DMN) of high purity without the use of a solvent.

The recovered isomers are useful for various purposes as known in the art. For example, the 2,6-DMN can be partially oxidized to produce dicarboxylic acid or other oxidation products. The diacid is particularly useful for the preparation of polyesters by the reaction with aliphatic diols such as ethylene glycol. The resulting polyesters are useful for the preparation of fibers, coatings and the like.

The usual manner of recovery of 2,6-DMN is from a hydrocarbon feed stock such as that derived from petroleum, coal tar, synthetic tar sand crudes, shale oil and the like. The feed stock is the preferable one containing a substantial amount of dimethylnaphthalenes, in particular the 2,6-isomer. Typically the feed stock contains at least 80%, preferably at least 90%, of aromatic hydrocarbons. The content of the 2,6-isomer in the feed stock is typically in the range of from 10 to 40 weight percent, preferably 15 to 30 weight percent.

Examples of suitable feed stocks are various highly aromatic fractions produced in petroleum refining and conversion processes. Higher boiling aromatic fractions produced in reforming of petroleum naphtha to produce high octane gasoline, are examples of such feed stocks. Aromatic fractions produced by the thermal cracking of catalytically reformed gasoline; aromatic fractions produced by the catalytic cracking of thermally reformed naphtha; and aromatic concentrates obtained from catalytic gas oil produced in catalytic cracking of petroleum; are additional examples of suitable feed stocks. The latter concentrates can be prepared, for example, by solvent extraction, e.g., with furfural, by selective adsorption, or by other known processes.

The usual procedure for recovering the free 2,6-DMN from the aromatic hydrocarbon feed is to cool the feed to precipitate a solid material containing one or more of the isomers, e.g., the 2,6-DMN in a concentrated but still crude form. The 2,6-DMN then is recrystallized, for example, from methanol. This procedure is repeated until the desired purity is reached. It is now possible to subject the resulting slurry to the procedure of the present invention to remove the residual mother liquor and avoid the crystallization and solvent with the result being the preparation of 2,6-dimethylnaphthalene of any desired purity up to 99+ percent.

DESCRIPTION OF THE DRAWINGS

FIGURE 3 is limited by the upper temperature limitation of FIGURE 2.

SUMMARY OF THE INVENTION

Briefly stated the present invention is the process of recovering 2,6-dimethylnaphthalene from a mother liquor containing 2,6-dimethylnaphthalene comprising the steps of crystallizing a portion of said mother liquor at a temperature in the range of −50 to 50° C., and heating said crystallized material in a plurality of temperature stages to a temperature below the temperature at which the 2,6-dimethylnaphthalene present is dissolved in the mother liquor under an effective gravitational force of at least 300 G's and recovering said crystallized material enriched in 2,6-dimethylnaphthalene. The gravitational force is achieved by the use of a centrifuge.

DESCRIPTION OF THE INVENTION

In order to concentrate a given isomer or isomers in the feed stock, it is usually desirable to obtain a relatively narrow boiling distillate fraction for use as the feed stock for the crystallization. In the case of 2,6-dimethylnaphthalene, a distillate fraction having boiling range of approximately 495 to 510° F., or some narrower boiling range within the range of 495 to 510° F., is preferred.

According to one embodiment of the invention, the feed stock is heated to a sufficiently high temperature to obtain solution of normally solid components in the liquid phase. In the case of fractions boiling in the range from 495 to 510° F. and containing 15 to 30 weight of 2,6-dimethylnaphthalene the fraction at room temperature is a slurry containing solid components as well as liquid components. The extent of heating necessary to obtain solution of such solid components may readily be determined by a person skilled in the art. The temperature varies depending upon the starting material, and in some cases no heating is required to obtain complete solution.

The feed stock is then cooled to crystallize solid material constituting a crude concentrate of the isomer or isomers to be recovered. Preferably the temperature of crystallization is in the range from −50° C. to 50° C.

Preferably the crystallization is carried out in the absence of an added solvent, and one of the advantages of the present invention is that highly satisfactory recovery of the desired isomer can be obtained by crystallization and subsequent procedure without the use of a solvent. It is within the scope of the invention, however, to employ a solvent in the crystallization, and the known solvents for crystallization of aromatic hydrocarbons are generally satisfactory.

When the 2,6-DMN is isolated from a mother liquor also containing 2,7-DMN there will be a 2,6-/2,7-DMN eutectic formed. The eutectic forms with the weight ratio of 2,6-/2,7-DMN being .725:1. The 2,6-DMN that can be recovered from such mixtures, according to the present invention, is that in excess of the 2,6/2,7-eutectic mixture.

The crystallization period is usually in the range from 2 to 5 hours, although satisfactory results can be obtained with other crystallization periods.

Figure 1:
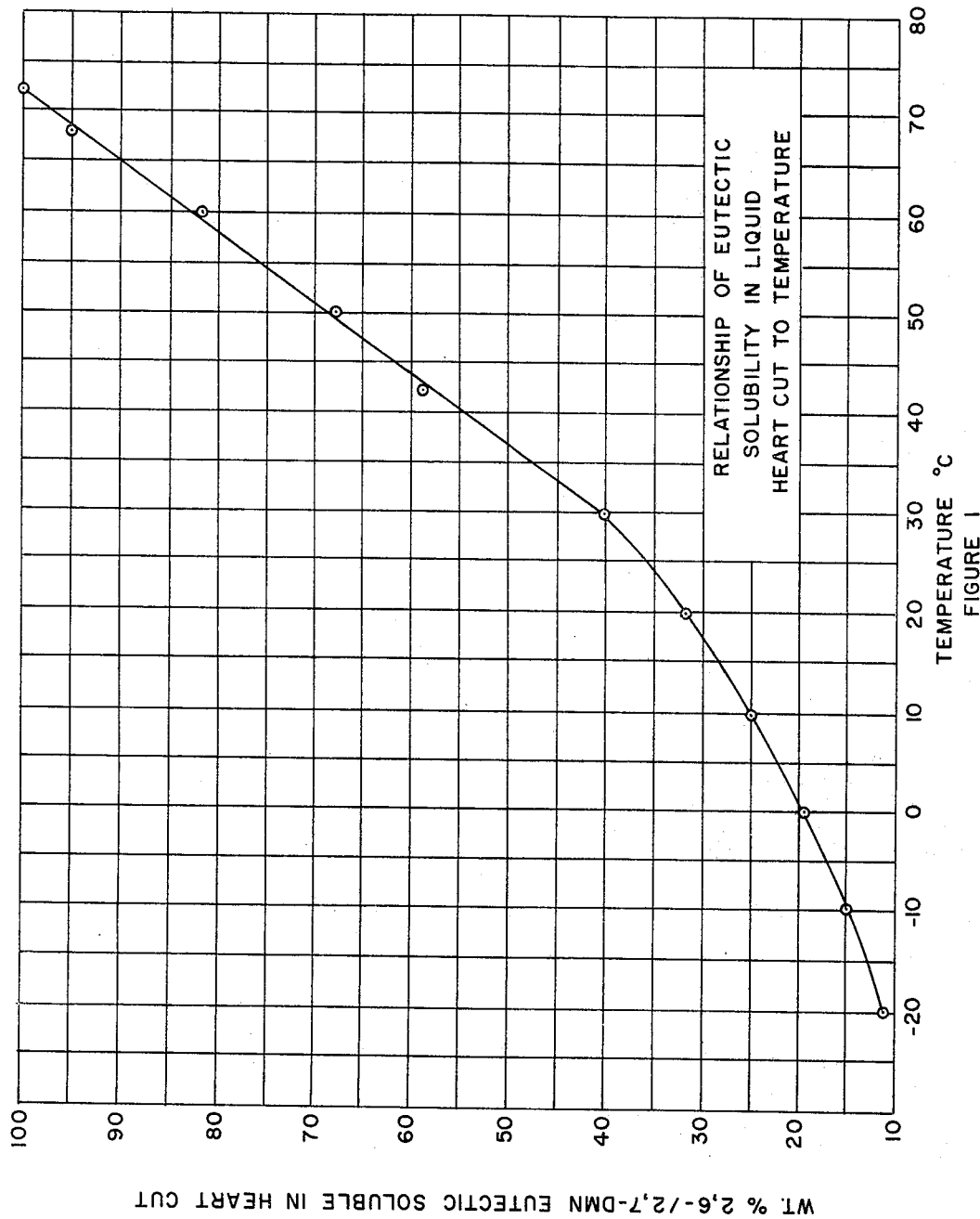
FIGURE 1 is a graph showing the weight percent of 2,6-/2,7-DMN eutectic at temperatures for the preparatory crystallization of a 2,6-/2,7-DMN containing feed stock.

The optimum temperature for crystallization can be selected by using the attached FIGURE 1 and the analysis of the feed material. The temperature should be just high enough to leave in solution all of the 2,6-/2,7-DMN eutectic. The following example will illustrate the procedure.

100 pounds of feed contained 25# 2,6-DMN, 28# 2,7-DMN, 47# other liquid aromatics boiling between 495–510° F.

The eutectic contains 42% 2,6-DMN and 58% 2,7-DMN. Therefore, the total eutectic is equal to 48.3% of the incoming feed. The desired temperature is that at which the 48.3% of eutectic will be soluble in the 47# of other liquid aromatics.

$$\frac{48.3}{48.3+47.0} = \frac{48.3}{95.3} = 50.6\%$$

From FIGURE 1, 50.6% eutectic is soluble at 37° C. Therefore, 37° C. is the preferred temperature for the initial crystallization.

In order to achieve high degrees of purity and good efficiency in the yield per cycle of free recoverable 2,6-DMN, reasonably careful temperature control is necessary. The highest temperature that can be employed is just below 110° C. which is the melting point of 2,6-DMN. However, this upper limit must be approached with extreme care since even small amounts of mother liquor this close to the melting point of the 2,6-DMN can result in the solution of considerable quantities of the 2,6-DMN and a corresponding reduction in the efficiency of this purification step. For this reason, an upper limit of 105° C. is preferred. The heating during the centrifuging is carried out in at least two stages. The centrifuging is continued at each stage for a period of time sufficient to remove as much mother liquor as possible, usually about 5 to 120 minutes, depending on the thickness of the filter cake and the speed of the centrifuging. Generally centifuging times of 15 to 60 minutes are employed with an effective gravitational force of preferably at least 800 G's.

Precise temperature control is not absolutely necessary in the subsequent stages of heated centrifuging so long as the temperature does not exceed a certain maximum temperature as described more fully below.

Figure 2:
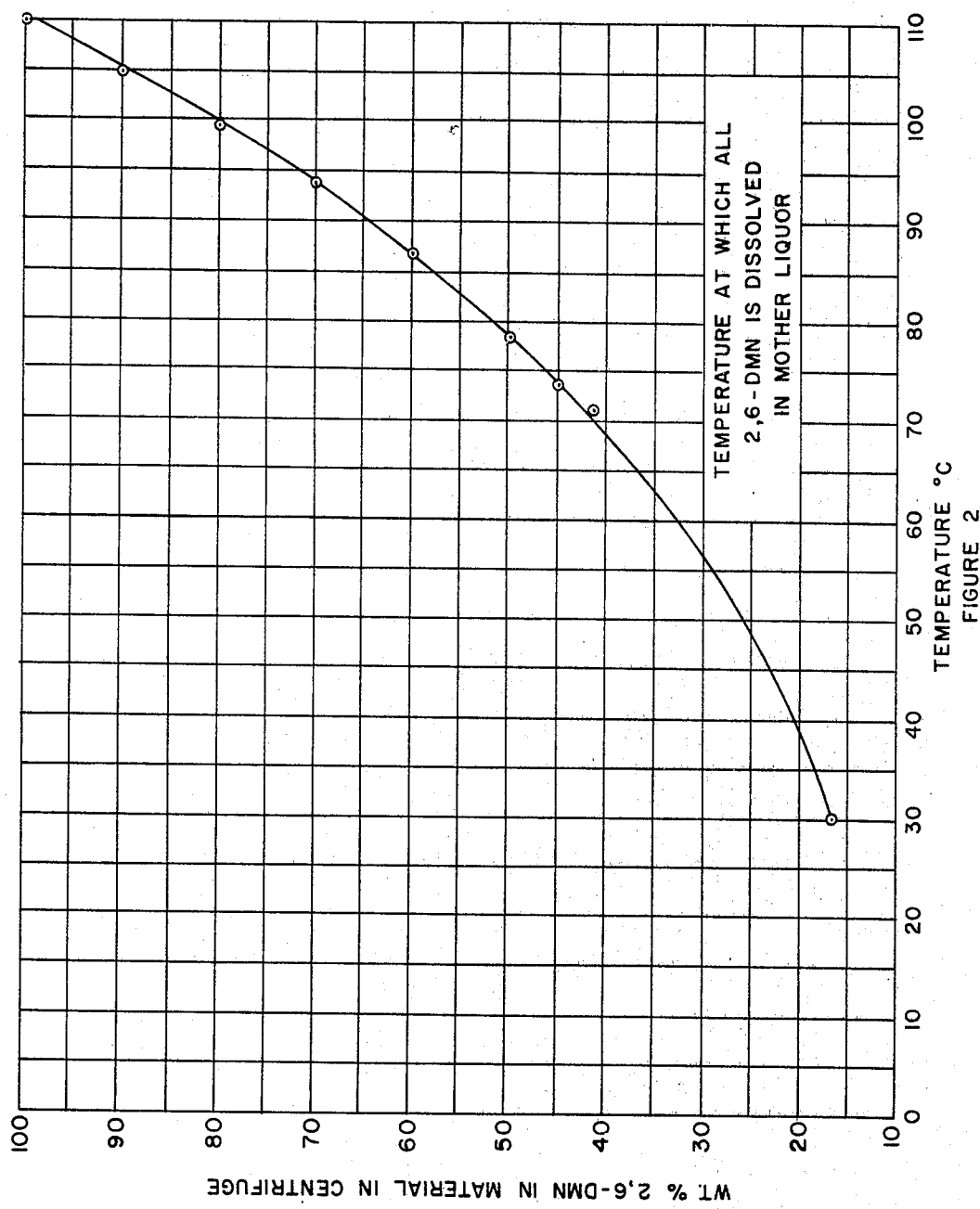
FIGURE 2 is a graph showing the temperature at which a particular weight percent of 2,6-DMN is totally dissolved in mother liquor thus providing the critical upper temperature limit of the centrifuging at any particular 2,6-DMN concentration.

If the first crystallization and centrifuging have been carried out at or above the optimum temperature, the material in the centrifuge will consist of pure, solid 2,6-DMN contaminated with mother liquor. The subsequent stages of heated centrifuging must be carried out at temperatures below that at which al the material in the centrifuge would be liquid. These temperatures can be calculated with the analysis of the total material in the centrifuge and the accompanying FIGURE 2. This figure shows the temperature at which a mixture of 2,6-DMN is completely soluble in the closely related liquids boiling close to the boiling point of the 2,6-DMN, i.e., mother liquor.

Figure 3:
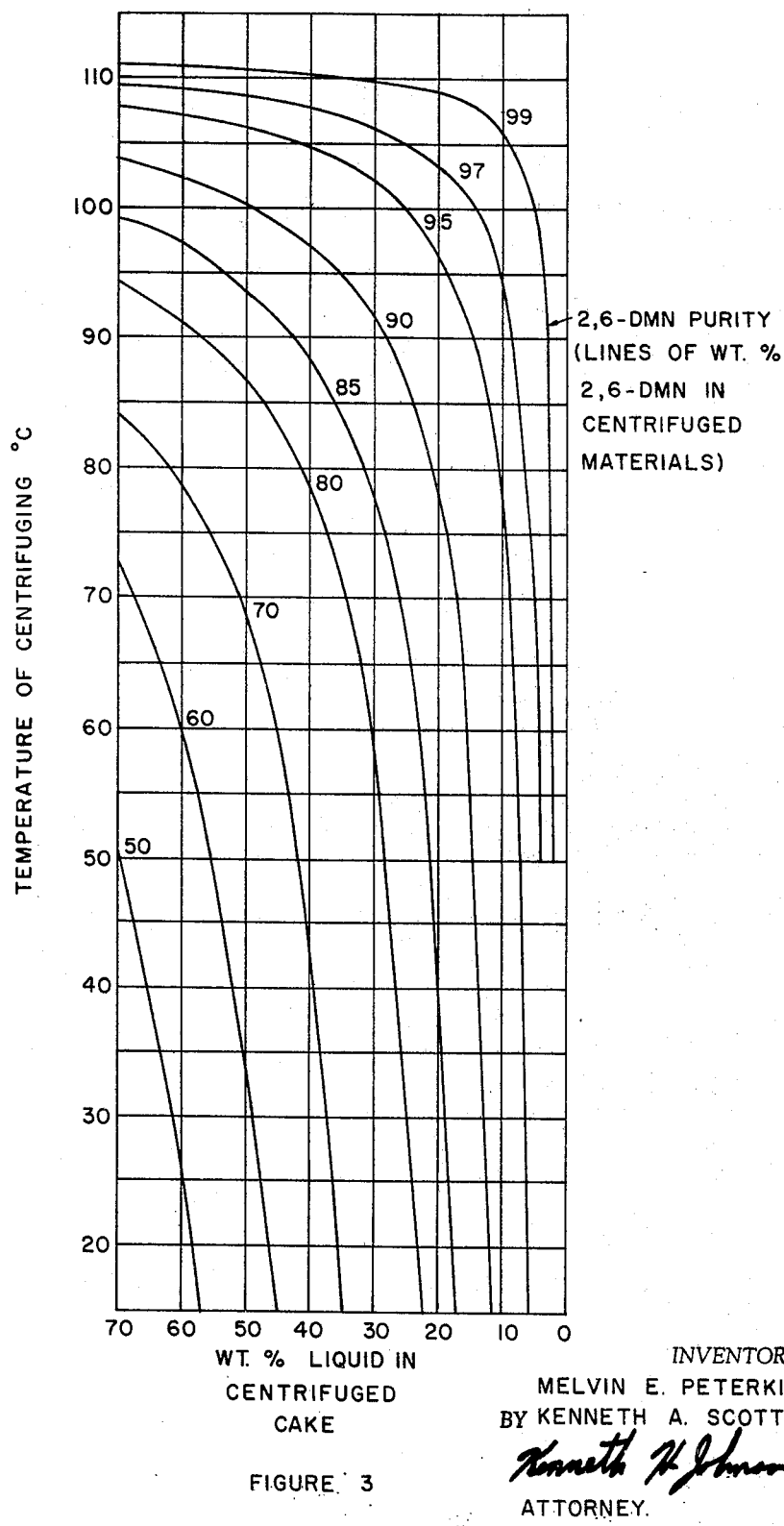
FIGURE 3 is a graph showing the temperature required for any desired purity of 2,6-DMN at a particular wetness at a particular temperature.

The temperature needed for any desired purity of final product can be determined by using FIGURE 3. The amount of liquid remaining in the centrifuged cake must be known first, however, if it is not, then knowing the amount of 2,6-DMN present, the liquid remaining can be determined from FIGURE 3. By this means, the centrifuge can be calibrated for any given condition of load, speed, time and temperature.

For example, Table I is based on centrifuging at 950 G's, assuming that 40% of the mother liquor was retained at each stage.

TABLE I

| Temperature °C.: | Degree of purity of centrifuge solids (weight percent 2,6-DMN) |
|---|---|
| 80 | 80.4 |
| 100 | 92.0 |
| 102.5 | 94.0 |
| 105 | 96.0 |

A minimum effective gravitational force of at least 300 G's must be employed. The upper limit of effective gravitational force is determined by centrifuge equipment limitations. Higher centrifuging speeds results in faster and more complete removal of mother liquor at any given temperature. By using higher centrifuging speeds less of the mother liquor is retained and higher purities are possible. An effective gravitational force of at least 800 G's is preferred for the best operation of the present invention.

The charge for the determination of Table I was a 26° C. crystallization slurry of 495–510° F. catalytic gas oil distillate fraction containing 25.0 weight percent 2,6-DMN and 28.0 weight percent 2,7-DMN. The balance of the feed was principally dicyclic aromatics. The constitution of the feed stream so long as there is free 2,6-DMN present does not affect the degree of pruity. However, in feeds containing less than 5 weight percent 2,6-DMN it is most advantageous to use three or four temperature stages and to approach the final temperature slowly, in order to avoid loss of the 2,6-DMN in the large excess of mother liquor.

The following examples are present to illustrate the present invention.

EXAMPLE 1

The following runs were made by chilling a 495–510° F. heart cut of catalytic gas oil to 26° C. and using the solids therefrom. The solid material was centrifuged at 950 G's for 30 minutes at each temperature indicated in a small (8 inch diameter) International Lab Size Basket Centrifuge with a fine wire mesh (120 mesh) screen liner in the basket. The centrifuge was placed in a forced air temperature controlled oven having temperature control of 1° ±C.

The feed for each run is different. This was achieved by adding certain liquid fractions containing significant amounts of 2,6-DMN from the preceding run to an original feed stock having the following analysis.

| Component: | Weight percent |
|---|---|
| Biphenyl | 0.1 |
| Ethylnaphthalenes | 3.3 |
| 2,6-DMN | 25.0 |
| 2,7-DMN | 28.0 |
| $C_{12}$'s | 29.9 |
| Other | 13.7 |

The analysis of 2,6- and 2,7-DMN for the feed of each run is given in Table II.

TABLE II

| | | | 63° C. | | | | 75° C. | | | | 95° C. | | | | 105° C. | | | | |
| | | Free | Liquid | | Solid | | Liquid | | Solid | | Liquid | | Solid | | Liquid | | Solid | | Percent Free |
| Components | Charge, Grams | 2,6-DMN,[1] Grams | Percent | Grams | Percent | Grams | Percent | Grams | Percent | Grams | Percent | Grams | Percent | Grams | Percent | Grams | Percent | Grams | 2,6-DMN recovered, Percent |
|---|---|---|---|---|---|---|---|---|---|---|---|---|---|---|---|---|---|---|---|
| Run: | | | | | | | | | | | | | | | | | | | |
| 1. 2,6 | 168.3 | 85.0 | 37.9 | 132.0 | 62.3 | 90.2 | 43.9 | 41.7 | 76.4 | 27.8 | 65.3 | 39.0 | 93.0 | 53.9 | 82.2 | 10.9 | 93.6 | 27.7 | 32.6 |
| 2,7 | 114.9 | | 44.1 | 74.1 | 34.8 | | 48.3 | 45.8 | 23.6 | | 34.0 | 20.3 | 7.0 | 4.1 | 17.8 | 2.4 | 6.4 | 1.9 | |
| Other | 22.8 | | 18.0 | 6.2 | 2.9 | | 7.8 | 7.4 | | | 0.7 | 0.4 | | | | | | | |
| Total | 306 | | | | | (118) | 95.0 | | | | 59.7 | | | (58) | | 13.3 | | 29.6 | |
| 2. 2,6 | 218.4 | 122.4 | 40.4 | 187.5 | 65.1 | | 41.1 | 66.5 | 87.2 | | 59.3 | 36.9 | 95.2 | 60.9 | 82.1 | 18.7 | 98.3 | 18.6 | 15.2 |
| 2,7 | 132.4 | | 43.6 | 99.4 | 34.5 | | 49.2 | 79.5 | 12.8 | | 38.6 | 24.0 | 4.8 | 30.7 | 17.9 | 4.1 | 1.7 | 0.3 | |
| Other | 13.2 | | 16.0 | 1.1 | 0.4 | | 9.6 | 15.4 | | | 2.2 | 1.4 | | | | | | | |
| Total | 364 | | | | | (288) | | 161.9 | | (126) | | 62.2 | | (64) | | 22.8 | | 18.9 | |
| 3. 2,6 | 196.6 | 142.1 | | | | | 44.9 | 48.9 | 87.3 | 146.6 | 62.0 | 29.1 | 95.0 | 115.0 | 87.1 | 26.4 | 98.1 | 40.1 | 34.6 |
| 2,7 | 75.2 | | | | | | 49.4 | 53.8 | 12.7 | 21.4 | 36.1 | 17.9 | 5.0 | 6.0 | 12.9 | 3.9 | 1.9 | 0.9 | |
| Other | 6.2 | | | | | | 5.7 | 6.2 | | | 1.7 | 7.9 | | | | | | | |
| Total | 278 | | | | | | | 108.9 | | (168) | | 47.0 | | (121) | | 30.3 | | 50.0 | |
| 4. 2,6 | 247.9 | 177.4 | | | | | 45.3 | 64.9 | 87.2 | 182.2 | 64.3 | 39.4 | 95.3 | 141.0 | 87.3 | 33.1 | 99.5 | 60.7 | 34.2 |
| 2,7 | 97.4 | | | | | | 49.3 | 70.6 | 12.8 | 26.8 | 35.5 | 21.8 | 4.7 | 7.0 | 12.7 | 4.8 | 0.5 | 0.3 | |
| Other | 7.7 | | | | | | 5.4 | 7.7 | | | 1.8 | 1.1 | | | | | | | |
| Total | 353 | | | | | | | 143.3 | | (209) | | 61.3 | | (148) | | 37.9 | | 61 | |
| 5. 2,6 | 272.0 | 200.5 | | | | | 46.6 | 62.5 | 86.2 | 208.6 | 61.9 | 53.7 | | | 85.9 | 31.8 | 99.0 | 72.3 | 36.0 |
| 2,7 | 98.6 | | | | | | 48.6 | 65.2 | 13.8 | 33.4 | 38.1 | 33.0 | | | 14.1 | 5.2 | 1.0 | 0.7 | |
| Other | 6.4 | | | | | | 4.8 | 6.4 | | | | | | | | | | | |
| Total | 377 | | | | | | | 134.1 | | (242) | | 86.7 | | (156) | | 37 | | 73 | |

[1] Recoverable as pure 2,6-DMN, i.e., excess of 2,6-DMN over that tied up in 2,6/2,7-DMN eutectic determined as grams free 2,6-DMN = Total grams 2,6-DMN -.725Xg: 2,7-DMN. Percent are by weight. All analyses are by vapor phase chromatography.

In any one run, the charge for each subsequent temperature stage was the wet solid product of the preceding stage. It should be noted, however, that the total products (liquid and solid) for the 105° C. temperature stage in each run is far less than solid charge. This is due to the volatilization and loss of a portion of the 2,6-DMN product at 105° C. This loss can be reduced by the use of superatmospheric pressure or other mechanical arrangements.

The liquid removed by centrifuging at any temperature stage will often contain appreciable amounts of free 2,6-DMN. In order to recover this 2,6-DMN the recovered liquid fractions are recrystallized at 0 to 100° C. (FIGURE 1) is used to determine optimum temperature) and recycled to the appropriate stage. This can be the first temperature stage or a subsequent stage. The determination of the optimum temperature stage for recycling the recrystallized liquid fraction is made from FIGURE 2 as previously described.

The invention claimed is:

1. The process of recovering 2,6-dimethylnaphthalene from a mother liquor containing 2,6-dimethylnaphthalene comprising the steps of crystallizing a portion of said mother liquor at a temperature in the range of −50 to 50° C., and heating said crystallized material in a plurality of temperature stages to a temperature below the temperature at which the 2,6-dimethylnaphthalene present is dissolved in the mother liquor under an effective gravitational force of at least 300 G's and recovering said crystallized material enriched in 2,6-dimethylnaphthalene.

2. The process according to claim 1 wherein the plurality of temperature stages comprises at least two stages provided that the maximum temperature in each of said stages is less than the temperature in FIGURE 2 at which all of 2,6-dimethylnaphthalene present is dissolved in the mother liquor.

3. The process according to claim 2 wherein there are more than two stages.

4. The process according to claim 3 wherein the final temperature is 105° C.

5. The process according to claim 4 wherein the effective gravitational force is at least 800 G's.

6. The process according to claim 1 wherein each temperature stage is maintained for a time in the range of 5 to 120 minutes.

7. The process according to claim 4 wherein each temperature stage is maintained for a time in the range of 15 to 60 minutes.

8. The process according to claim 2 wherein a liquid fraction recovered from one or more temperature stages is recrystallized at a temperature in the range of 0 to 100° C. and recycled.

References Cited

UNITED STATES PATENTS 3,249,644   5/1966   Hahn _____ 260—674

DELBERT E. GANTZ, Primary Examiner
CURTIS R. DAVIS, Assistant Examiner